(12) United States Patent
Franke et al.

(10) Patent No.: US 8,359,316 B2
(45) Date of Patent: Jan. 22, 2013

(54) DATABASE TABLE LOOK-UP

(75) Inventors: Hubertus Franke, Cortland Manor, NY (US); You-Chin Fuh, San Jose, CA (US); Hong Min, Pougheepsie, NY (US); Terence P. Purcell, Springfield, IL (US); Yefim Shuf, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/714,617

(22) Filed: Mar. 1, 2010

(65) Prior Publication Data

US 2011/0213775 A1 Sep. 1, 2011

(51) Int. Cl.
*G06F 7/00* (2006.01)
(52) U.S. Cl. ........................................ 707/737
(58) Field of Classification Search .................. 707/737
See application file for complete search history.

(56) References Cited

U.S. PATENT DOCUMENTS

| | | | |
|---|---|---|---|
| 5,706,495 A | 1/1998 | Chadha et al. | |
| 5,778,354 A | 7/1998 | Leslie et al. | |
| 6,014,656 A * | 1/2000 | Hallmark et al. | 1/1 |
| 7,047,250 B1 | 5/2006 | Agarwal et al. | |
| 2002/0078015 A1 | 6/2002 | Ponnekanti | |
| 2006/0190461 A1 | 8/2006 | Schaefer | |
| 2006/0282422 A1 | 12/2006 | Al-Omari et al. | |
| 2009/0132474 A1* | 5/2009 | Ma et al. | 707/2 |
| 2009/0204570 A1* | 8/2009 | Wong | 707/2 |
| 2010/0030800 A1* | 2/2010 | Brodfuehrer et al. | 707/102 |
| 2010/0241893 A1* | 9/2010 | Friedman et al. | 714/2 |

* cited by examiner

*Primary Examiner* — Jensen Hu
(74) *Attorney, Agent, or Firm* — Ryan, Mason & Lewis, LLP

(57) ABSTRACT

Techniques for database table look-up are provided. The techniques include storing one or more column attributes of a database table in a data structure, wherein the data structure also comprises a record identification (RID) column of a table, one or more predicate columns corresponding to the RID column, and a sequence number column that is associated with one or more updated records, generating a key using one or more portions from one or more of the one or more predicate columns, using the key to partition the data structure, wherein partitioning the data structure comprises partitioning the one or more predicate columns for evaluation, and evaluating the one or more predicate columns against the data structure for each matching predicate column-data structure partition.

25 Claims, 10 Drawing Sheets

DATABASE TABLE LOOK-UP

FIELD OF THE INVENTION

Embodiments of the invention generally relate to information technology, and, more particularly, to data processing.

BACKGROUND OF THE INVENTION

Database administrators (DBAs) use indexes to speed up large table lookup in query workloads. Indexes are built over columns that appear in many predicates or are referred to often, and the indexes can be implemented as a B-tree.

In multi-column indexes, a first column of the index key (leading column) is stored in sorted order for fast B-tree searching, while non-leading columns might need index scanning. DBAs can create many multi column indexes with different column combinations and permutations to satisfy different predicate variations. In single-column indexes, there is access to multiple indexes for predicates across different columns. Index ANDings or ORings are needed, and multiple record ID (RID) sorts are often needed as well. ANDing refers to finding an intersection of two or more record lists. ORing refers to finding unions of two or more record lists.

However, operations and costs exist when using an index for query evaluation. For example, index use requires B-tree lookup on indexes, sorting of record identification (ID) lists, and intersections of record ID (RID) lists. Additionally, an index needs to be updated at the same time as data is updated and/or inserted, which can slow down online transaction processing (OLTP) workloads and/or add more tasks to an extract, transform and load (ETL) process.

SUMMARY OF THE INVENTION

Principles and embodiments of the invention provide techniques for database table look-up. An exemplary method (which may be computer-implemented) for database table look-up, according to one aspect of the invention, can include steps of storing one or more column attributes of a database table in a data structure, wherein the data structure also comprises a record identification (RID) column of a table, one or more predicate columns corresponding to the RID column, and a sequence number column that is associated with one or more updated records, generating a key using one or more portions from one or more of the one or more predicate columns, using the key to partition the data structure, wherein partitioning the data structure comprises partitioning the one or more predicate columns for evaluation, and evaluating the one or more predicate columns against the data structure for each matching predicate column-data structure partition.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (n) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
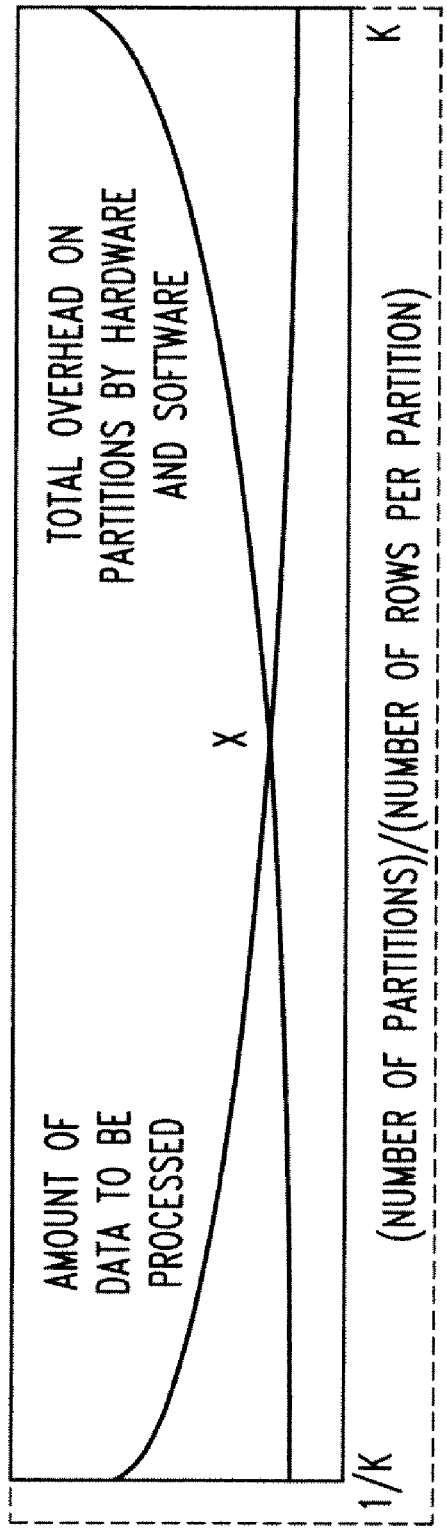
FIG. 1 is a graph illustrating identification of performance optimization, according to an embodiment of the present invention.

Principles of the invention include efficient database table look-up. The techniques detailed herein include providing a single, data structure that stores encoded column attributes. One or more embodiments of the invention include table access techniques for query processing, for example, to avoid creating too many indexes, including multi-column indexes with different combinations or permutations, reduced space, extract, transform and load (ETL) process (table/index update time) in a data warehouse, etc. Such techniques can also address issues of significant performance differences between the cases when the predicate columns are leading key columns in indexes and non-leading key columns. Additionally, one or more embodiments of the invention include avoiding multiple individual index accesses that involve looking-up and set operations on multiple record identification (RID) lists.

The techniques described herein include using a data structure that stores RIDs and predicate columns of a table. The data structure can answer queries using various combinations of predicates with consistent performance. One or more embodiments of the invention include encoding the values of all interesting columns (that is, predicate columns) with bit string encoding or integer encoding. A data structure can be used to hold all RIDs of a table and their corresponding encoded predicate columns, as well as data of other columns (such as, for example, frequently queried data columns).

Also, one or more embodiments of the invention include constructing a special key that is a concatenated bit string (or integer) by taking a few bits (or digits) from each of all or some encoded predicate columns. The bit (digit) positions are fixed within each column. The data structure can be partitioned using this special key. Further, the predicates can be partitioned to be evaluated using the same data structure partitioning mechanism. This partitioning mechanism can be a multidimensional scheme to divide the data structure and decouple the predicate search into less work.

The techniques detailed herein can additionally include evaluating (for example, via a scan or search) predicates against the data structure for each matching predicate-data structure partition. One or more embodiments of the invention also include over-partitioning the data structure (that is, creating more partition than expected number of threads) because predicates are usually specified on a subset of columns. Some partitions can be merged (logically not physically) during predicate evaluation. This partitioning mechanism can be used in conjunction with bloom filtering for partition/predicate pruning.

As detailed herein, one or more embodiments of the invention include a data structure and storage. All interesting columns (predicate columns) are encoded with bit string encoding or integer encoding. If a column has n distinct values, a set of n distinct integers can be used to represent them. Another space efficient representation is to use a string of bits with the least possible number of bits to represent all distinct values. A dictionary for each column can be used for storing column value and encoding mapping. In one or more embodiments of the invention, exceptions exist for some cases when columns are integer or bit string data type.

For columns with non-cardinal data, encoding can be used on partial column values or applying hash function on the columns. For example, for a column of FLOAT number type, encoding can be done using an INTEGER part of the number rather than including the least significant trailing decimal digits which are usually not part of query predicates. Similarly, timestamp columns are generally not the subject of an equals predicate (because of the milliseconds or seconds portions are generally not known in applications), and queries generally search for a range by day(s), month(s) or year(s). It is more reasonable to use encoding dictionary timestamps on the leading attributes of a timestamp such as hours/days/months/years rather than including the seconds or sub-second attributes. This approach can be extended to data types such as variable characters (that is, strings of variable lengths) to encoding leading (or ending or some other location) characters or apply hash function on the strings. This partial data encoding requires that data be compared with predicates after retrieval for an exact match.

One or more embodiments of the invention, as noted herein, include using a data structure to hold all RIDs of a table and their corresponding encoded predicate columns, as well as data of some other columns such as frequently queried data columns. In one possible layout, for each RID, all of their corresponding columns can be stored physically together one after another (that is, contiguously). Another possible layout is to use individual array for RIDs and each encoded column. Elements at the same offset of all arrays would correspond to one row in the table. Additionally, in one or more embodiments of the invention, a combination of the above options can be used. Further, in any of above layouts, if, for a combined column value, there is more than one RID, one or more embodiments of the invention can store the extra RIDs via chaining and open addressing (similar to how hash collisions are handled) in the RID list array. Alternatively, duplicated combined column values are stored duplicately with different RIDs in corresponding RID array.

A new index can be used in an operational environment. Although unlikely for indexed columns, there is still a chance that a dictionary can overflow, which is when the column cardinality grows beyond what selected encoding data type's range. One solution includes reusing an encoding value for more than one data value. This generates a false positive result in the RID list for input/output (I/O), which might be acceptable for some database systems because a predicate is always re-applied for certain operations. Another solution includes creating a second dictionary which can use a wider data type for updated column data that cannot be resolved using the initial dictionary. Because this overflow happens during update time, and the data causing the dictionary overflow is only stored in UPDATE segment (described herein, also referred to as delta store) which holds much less data than stable stores, this secondary dictionary is only used for delta store. Eventually, when delta stores and stable stores are merged, the dictionary for the column is rebuilt.

As also noted above, the techniques detailed herein include constructing a special key that is a concatenated bit string (or integer) by taking a few bits (or digits) from each encoded predicate column. The bit (digit) positions are fixed within each column, and the data structure can be partitioned using this special key. Such a construction can handle predicates on any combination of some or all of the columns used in the data structure (and to perform computations more efficiently). The key can take the same fixed number of bits from each column or, alternatively, the key can take more bits from columns with higher cardinally and fewer bits from columns with lower cardinally. One or more embodiments of the invention avoid taking the highest bit (digit) because it might not sufficiently represent distributions. For example, the highest bit of an 8-digit binary bit string to represent an integer in the range of 0 and 128 is 0 for all integer values except the value 128.

Additionally, one or more embodiments of the invention include using the different values of this key to partition the data. Multiple RIDs for same combined column value are stored within the same partition using chaining or open addressing, as described above. The total number of bits of this key is determined by the maximum number of potential available threads that can be used to concurrently process this data structure. For example, if as much as 256 threads are expected, the length of the key can be 8 bits, taken from different columns, and the data structure is partitioned into at least 256 partitions (that is, the number of processing threads). However, in one or more embodiments of the invention, there are reasons for over-partitioning (that is, to create more partition than expected number of threads), as mentioned above.

One or more embodiments of the invention also include predicate evaluation against the data structure. The predicates can be partitioned to be evaluated using the same data structure partitioning mechanism detailed above. Partitioning on both data and predicates reduces the useless work of finding rows that do not match certain predicates. A query has a predicate on several columns with a list of values for each column. For each predicate column, one or more embodiments of the invention include looking up the column's encoding dictionary to find encoding values for the predicates. Additionally, for each predicate column, the encoded predicate values can be assigned to different partitions by looking up their bits at the same positions of the column used for constructing the partition key and matching corresponding bits for partition key values.

Based on the predicate partitioning, some partitions in the data structure can be pruned from predicate evaluation depending on the operators among predicate columns. For any two predicate columns, if the operator in the predicate is a logical operator AND, then any partition that does not get at least one assigned encoded predicate value from each of the two predicate column is pruned. For any two predicate columns, if the operator in the predicate is a logical operator OR, then any partition that does not get at least one assigned encoded predicate value from either of the two predicate column is pruned. The above steps, in one or more embodiments of the invention, can be used iteratively for predicates with more columns and mixed logical operators.

Because some partitions will be pruned from predicate evaluation, to maximize the utilization of available threads, one or more embodiments of the invention can include dividing the data structure into more partitions by increasing the number of key bits (for example, via over-partitioning). Also, because the predicate columns can be a subset of all columns in the data structure, some partitions might be assigned the same subset of predicates, effectively diminishing the purpose of partitioning, which is to reduce the useless work of finding rows that do not match certain predicates. Over-partitioning can enable further splitting of the working set and reduce unnecessary computation.

If the number of remaining partitions after pruning is still higher than the number of available threads, then one or more embodiments of the invention can include merging partitions. Depending on hardware, data size, and predicate size, there can be different variations of a merge. If the original partitions all have approximately the same number of rows, then the number of remaining partitions can be reduced to half by combining every two partitions into one (logically) to maintain about the same data size for each thread for predicate evaluation. If the original partitions vary by size, some of them can be combined so that most partitions have approximately the same number of rows.

Additionally, one or more embodiments of the invention can include combining partitions such that each partition has about the same number of predicates to evaluate. Alternatively, large partitions can further be split logically. This is equivalent to sending more threads to work on the same partition but at different offsets of partition data storage.

The techniques described herein also include evaluating predicates against the data structure for each matching predicate-data structure partition. Evaluation of encoded predicates can be done via scan or search, and can include flattening the nested logical AND or OR operators among columns. Scanning can be more suitable when the total number of combinations of all encoded column predicate values is low.

Searching (for example, binary searching) can be more suitable when the total number of combinations of all encoded column predicate values is high, and/or when all or some of the predicate columns each have a list of encoded predicate values to be matched. One or more embodiments of the invention include sorting encoded predicate values for each column. For each row, each column with predicate can be evaluated by using a binary search to see if the row's column value exists in the predicate list of the same column. This can be done iteratively until the predicates are evaluated to TRUE, meaning, for example, the following.

If all predicate columns are connected by AND, then all interesting column values have to exist in the predicate lists. If there is a column for which a search finishes without a match, then the search for other columns of that row does not need to take place. If all predicate columns are connected by OR, then at least one interesting column's value has to existing in the predicate lists. If there is a column for which a search finishes with a match, then the search for other columns of that row does not need to take place. If all predicate columns are connected by the mix of AND and OR and the structure is flattened, then a logic similar to the above two techniques can be applied iteratively.

Hash searching can be more suitable when the total number of combinations of all encoded column predicate values is high, and/or all or some of the predicate columns each has a list of encoded predicate values to be matched. One or more embodiments of the invention include applying a hash function to encode predicate values for each column and to build a hash array for each. For each row, each column with a predicate can be evaluated by using the same hash function to see if the row's column value exists in the predicate list of the same column. This can be done iteratively until the predicate is evaluated to TRUE, meaning, for example, the following.

Whether to use a hash search or binary search can depend on the hardware architecture and the size of predicates assigned to each partition. If predicate lists are short, then one or more embodiments of the invention include using a binary search. Performance-wise, scan can be more applicable if the supplied predicates are lower cardinality, and matching more applicable if higher cardinality. In any above search for predicate evaluation, if the missing predicate columns are only a few low cardinality columns, one or more embodiments of the invention can also include generating possible encodings for those columns for matching on high cardinality columns. In such an instance hashing might be more appropriate. Introducing bloom filtering on a few high cardinality columns may also help narrow down the match. In one or more embodiments of the invention, one special case of hashing is to perform direct lookup of a column value in predicate list.

One or more embodiments of the invention additionally include aggregating all qualified RIDs from all partitions and using them to retrieve the corresponding data. One purpose of partitioning is to use less expensive preprocessing to reduce the amount of predicates each row has to be evaluated. Partitioning is a multidimensional scheme to divide the data structure and decouple the predicate search into separate divided data structures.

In choosing bit columns as partition IDs, one or more embodiments of the invention can include adding certain heuristics to determine whether a bit can provide more benefit if chosen as a partition ID bit. For example, if a bit column is mostly 0 or 1, then it is less likely to provide filtering for partition pruning and working set pruning. Also, when the number of partitions is very high, a partition ID essentially can be used as an index pointing to an address in a storage which might contain the matching row. A sweet spot can be identified for best performance, wherein the amount of data to be examined (after pruning) balances with the overall partition overhead (fixed and those proportional to number of partitions or size of partitions), such as, for example, depicted in FIG. 1. FIG. 1 is a graph 102 illustrating identification of performance optimization, according to an embodiment of the present invention.

When taking a subset of encoded bits from each column to compose a partition key, one or more embodiments of the invention can include favoring certain columns over other columns based on predicate patterns. For example, if a low cardinality column appears more frequently in predicates, the partition bits can take more bits from this column than other columns for the purpose of better partition pruning in workloads. In one or more embodiments of the invention, further partitioning of partition IDs is also possible (that is, multi-tier partitioning).

Parallel bloom filters can be introduced on each of two or three high cardinality wide columns to each partition to further prune predicates/partitions before each partition is scanned. This can benefit if Cardinality(C1)*Cardinality (C2)>numberOf TotalRows. The false positive is again directly related to space used for bloom filters. Another option in partitioning is to only use bits from low cardinality columns for partitioning, and to build bloom filters for high cardinality columns. The benefit is that less extra storage can be used in bloom filters than leading bits to provide partition selection.

The data structure described in connection with one or more embodiments of the invention can be updated while the underlying database table is updated at a time such as insert, load, and data re-organization. The data structure can also be updated periodically to synchronize with an underlying database table. In one or more embodiments of the invention, only the synchronized structure can be used to answer queries asking for synchronized data. This can be useful in examples such as when the underlying table's update is always at the end of table (or last table partition) but queries look for other data.

To improve update efficiency, multiple instances of the data structure can be created to align with the underlying partitioning/clustering of the table (such as, for example, one instance per table partition). For example, if the table is partitioned by different ranges of column A's value into x partitions, x different instances of the data structures can be created corresponding to the x data partitions. The dictionaries of each column used for the data structures are still the same and shared among all x instances except for column A. Column A's dictionary can be separated into x smaller ones. Also, an alternative is not to split but to add information in column A's dictionary to point to different instances of the data structure.

Further, in one or more embodiments of the invention, one could further sort rows within each partitions based on one or a subset of columns or their encoding values (or, for example, their hash values) or the RIDs to speed up predicate search on those columns.

As detailed herein, one or more embodiments of the invention include using dictionaries. A dictionary can be used to map distinct values of a column into distinct bit strings for efficient RID (or data) search against various predicates. The dictionary can be built during the data structure build and updated while the data structure is built. The building of the dictionary can be performed via exact matching for different column values one-by-one or via using a hashing function with chaining or open addressing. Dictionaries can be sorted and encoded on key order for fast search and range predicate handling. Predicates can also be sorted to speed up binary searching for matching a list of predicates. This is because searching for a next element of a higher value predicates will start where the previous one stops. This would also provide a sorted list encoding.

The search on a dictionary can be a scan, binary search if the dictionary is sorted, or hashing. In some cases, dictionaries can remain unchanged or little changed for a relative long period of time. When a dictionary changes and grows more frequently and its number of distinct values is higher than what the bit string can represent, the data structure needs to be rebuilt for that column. To avoid frequently rebuilding, one or more embodiments of the invention include using extra bits in the bit string to allow growth. As described herein, those bits might not be picked as partition bits if they are initially all 0 or 1 in all rows during the build.

Also, to avoid data structure rebuild, one or more embodiments of the invention include using an existing entry in the dictionary to also represent the new values. To maintain search performance on the dictionary, this duplicate representation can be performed via hashing or by adding to the existing entry in a sorted dictionary whose search location would be the same for the new value. Because this duplication/collision introduces false positives, the records fetched from underlying table need to be evaluated against the columns to remove the unmatched ones. In one or more embodiments of the invention, the above-described mechanism can be generalized to create smaller dictionaries. Again, this introduces collision and false positives during predicate evaluation, and the records fetched from underline table need to be evaluated against the columns again to remove the unmatched one.

In another approach for creating dictionary, it is not necessary to store the encoded bit. One or more embodiments of the invention include taking each distinct value of a column, applying a hash function and storing the columns value at the offset of an array to which the hash value points. Collision is dealt with by open addressing to a different offset. Then, the binary representation of the offset is the encoding of that column value. There may be cases, for example, when this increases number of encoding bits slightly.

One or more embodiments of the invention can be used as an access method during query processing. For single table predicate evaluation, single or multiple predicates on single or different columns of the same table with said data structure can be evaluated at once using one or more embodiments of the invention. Also, to use this access method in join, one or more embodiments of the invention can include taking a join predicate from the other table at a time and search the data structure in this access method. Also, all distinct join predicates can be collected from several other tables that will be joined to the table with the data structure and those distinct join predicates can be applied to different columns to search all at once.

Figure 2:
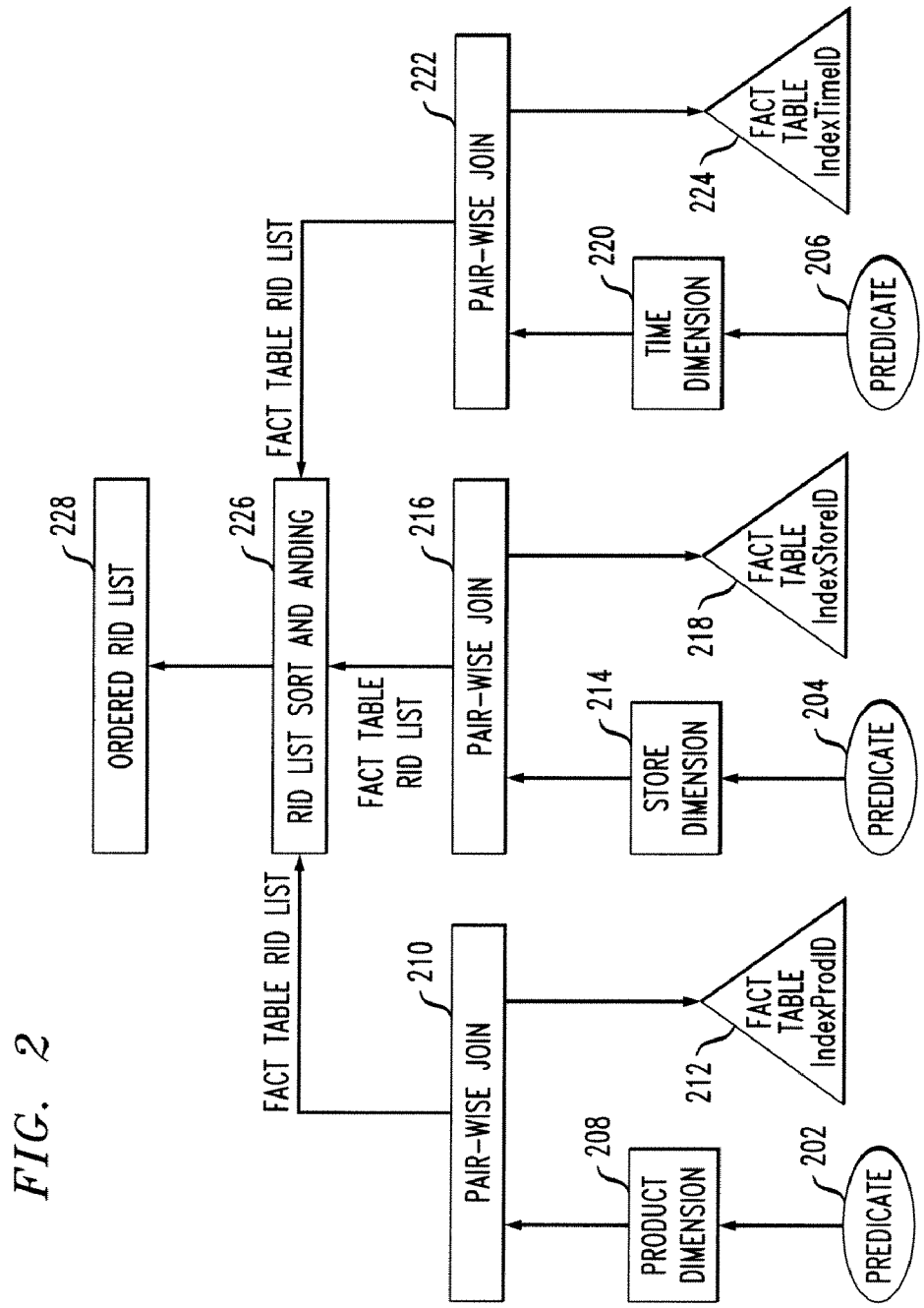
FIG. 2 is a diagram illustrating a multi-dimensional join approach, according to an embodiment of the present invention.

FIG. 2 is a diagram illustrating a multi-dimensional join approach, according to an embodiment of the present invention. By way of illustration, FIG. 2 depicts predicates 202, 204 and 206. Predicate 202 sends data to a product dimension component 208, which sends data to pair-wise join 210, which can send data to an index such as fact table index product ID 212. Predicate 204 sends data to a store dimension component 214, which sends data to pair-wise join 216, which can send data to an index such as fact table index store ID 218. Also, predicate 206 sends data to a time dimension component 220, which sends data to pair-wise join 222, which can send data to an index such as fact table index time ID 224. Further, pair-wise joins 210, 216 and 222 can send data (for example, a fact table RID list) to a RID list sort and Anding component 226, which can generate an ordered RID list 228.

Figure 3:
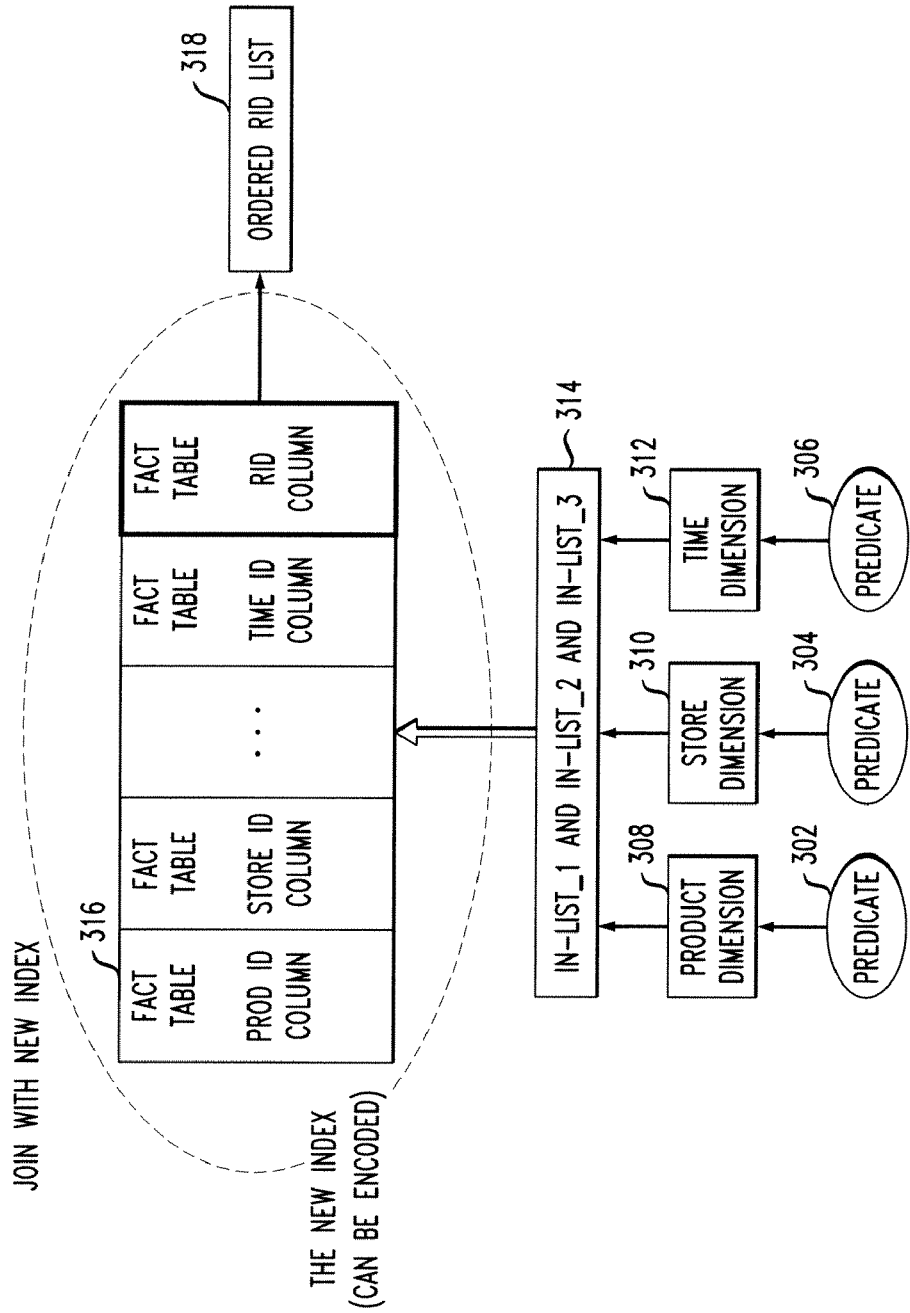
FIG. 3 is a diagram illustrating storing each column data, according to an embodiment of the present invention.

FIG. 3 is a diagram illustrating storing each column data, according an embodiment of the present invention. By way of illustration, FIG. 3 depicts predicates 302, 304 and 306. Predicate 302 is sent to a product dimension table 308, predicate 304 is sent to a store dimension table 310, and predicate 306 is sent to a time dimension table 312. Dimension data 308, 310 and 312 can send data to list data 314, then three join list predicates, depicted as 314, are combined and sent to the new index 316, which can match the predicates and can generate an ordered RID list 318. By storing each column data (or the encoded values) in a contiguous column format in entry order, one or more embodiments of the invention can apply multiple in-list lookup and Anding in one scan of the new index (for example, as depicted in FIG. 4).

Figure 4:
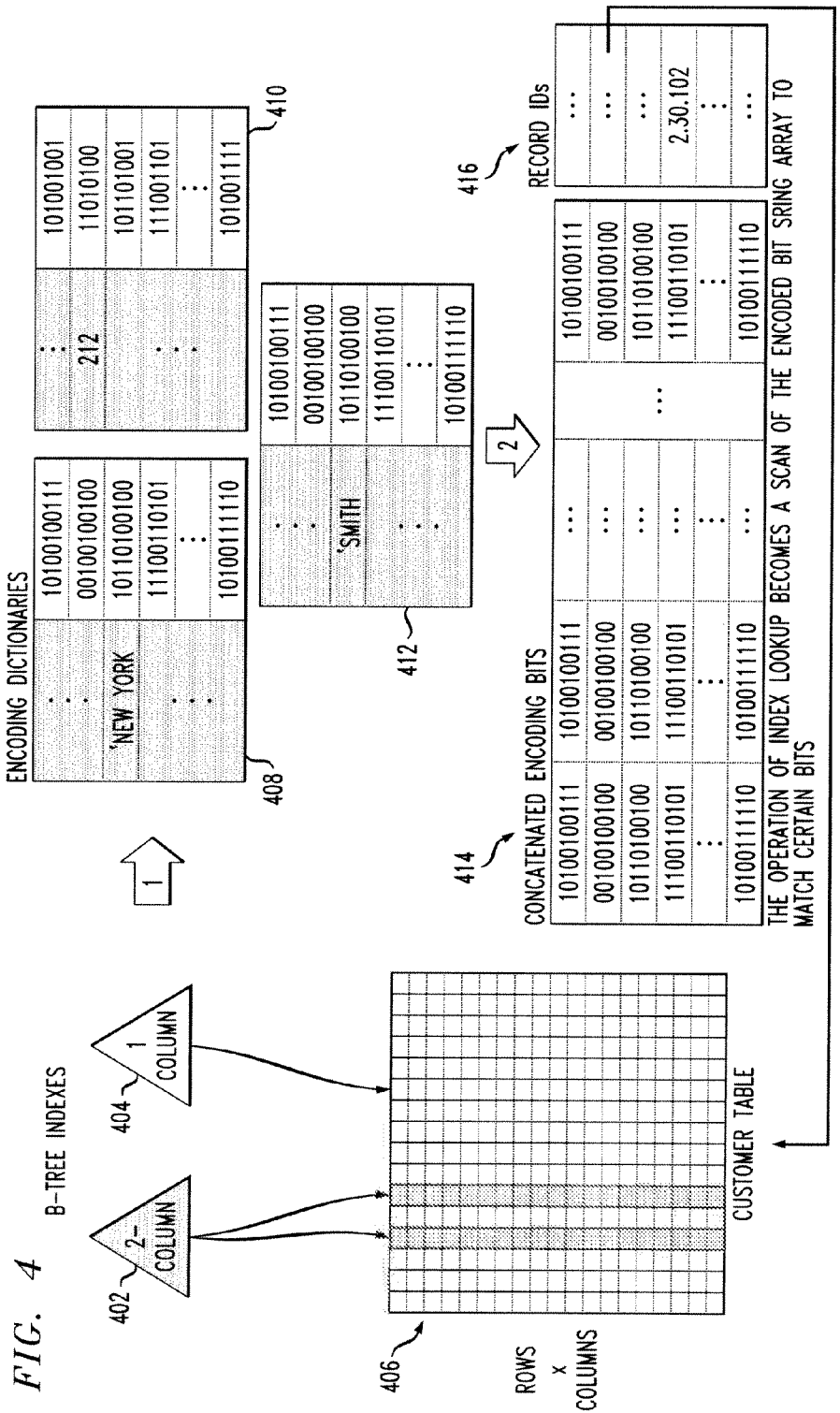
FIG. 4 is a diagram illustrating data lookup, according to an embodiment of the present invention.

FIG. 4 is a diagram illustrating data lookup, according to an embodiment of the present invention. By way of illustration, FIG. 4 depicts B-tree indexes 402 and 404, a customer table 406, encoding dictionaries (including unique values of each column) 408, 410 and 412, a concatenated encoding bits table 414, and a record IDs table 416. The left side of FIG. 4 depicts searching using an index lookup, as performed via using existing B-tree indexes approach. The two triangles (that is, components 402 and 404) are two indexes. On the bottom left, the table 406 is depicted. The right side of FIG. 4 depicts how the new index is used. Components 408, 410 and 412 illustrate how three columns can be encoded and build an index (that is, components 414 and 416). Component 414 is the data attributed column and component 416 is the RID column.

Figure 5:
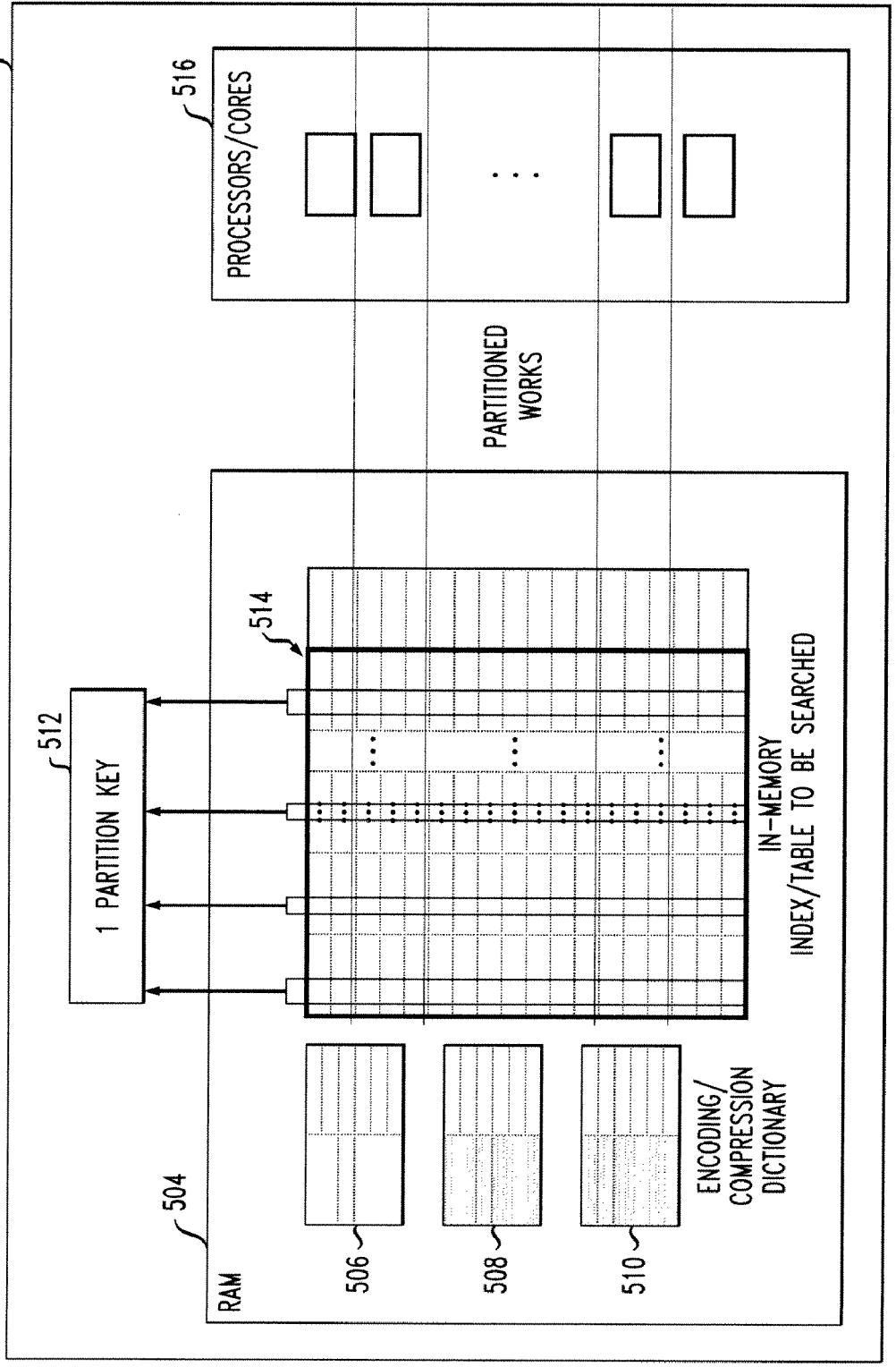
FIG. 5 is a diagram illustrating partitioning a data structure, according to an embodiment of the present invention.

FIG. 5 is a diagram illustrating partitioning a data structure, according to an embodiment of the present invention. By way of illustration, FIG. 5 depicts a structure 502 that contains the following components. The structure includes a RAM component 504 that includes encoding/compression dictionaries 506, 508 and 510, as well as an in-memory index/table 514 to be searched. The index/table 514 provides input to a partition key component 512. Component 516 illustrates how the data partitions can be used for parallel processing in a multi-core or multi-processor system.

Figure 6:
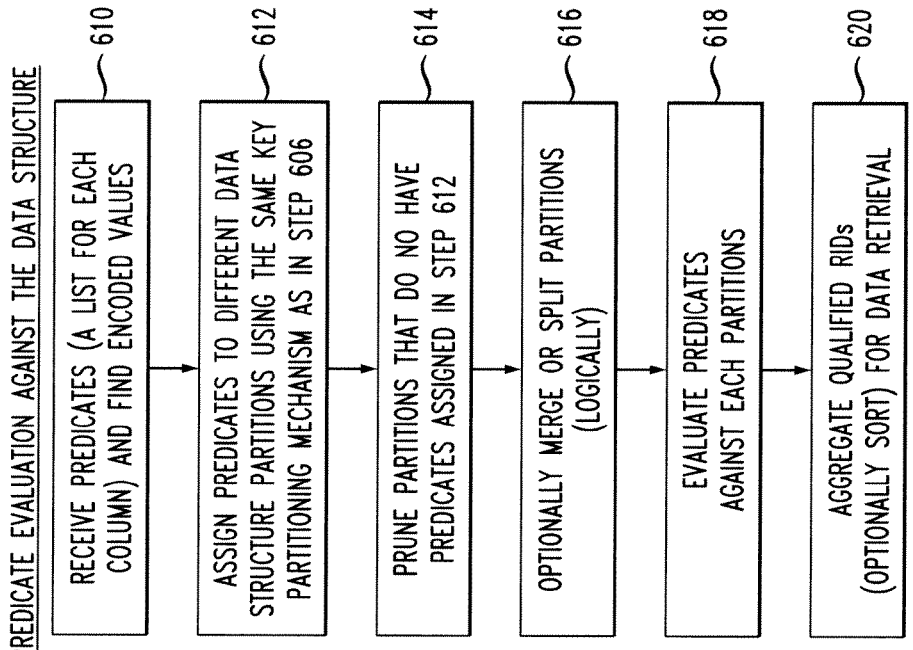
FIG. 6 is a flow diagram illustrating data structure build and predicate evaluation against the data structure, according to an embodiment of the present invention.
Figure 6:
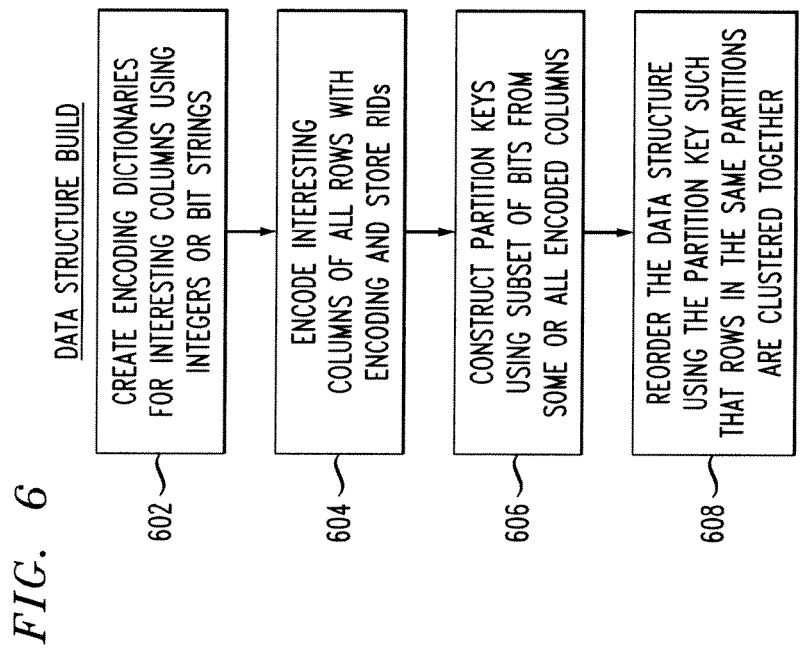

FIG. 6 is a flow diagram illustrating data structure build and predicate evaluation against the data structure, according to an embodiment of the present invention. By way of illustration, FIG. 6 depicts a data structure build, which includes the following steps. Step 602 includes creating encoding dictionaries for interesting columns using integers or bit strings. Step 604 includes encoding interesting columns of all rows with encoding and storing RIDs. Step 606 includes constructing partition keys using subset of bits from some or all encoded columns. Also, step 608 includes reordering the data structure using the partition key such that rows in the same partitions are clustered together.

FIG. 6 also depicts predicate evaluation against the data structure, which includes the following steps. Step 610 includes receiving predicates (a list for each column) and finding encoded values. Step 612 includes assigning predicates to different data structure partitions using the same key partitioning mechanism as in step 606. Step 614 includes pruning partitions that do not have predicates assigned in step 612. Step 616 includes optionally merging or splitting partitions (logically). Step 618 includes evaluating predicates against each partition. Also, step 620 includes aggregating qualified RIDs (and optionally sort) for data retrieval. the following steps. Step 610 includes receiving predicates (a list for each column) and finding encoded values. Step 612 includes assigning predicates to different data structure partitions using the same key partitioning mechanism as in step 606. Step 614 includes pruning partitions that do no have predicates assigned in step 612. Step 616 includes optionally merging or splitting partitions (logically). Step 618 includes evaluating predicates against each partition. Also, step 620 includes aggregating qualified RIDs (and optionally sort) for data retrieval.

Figure 7:
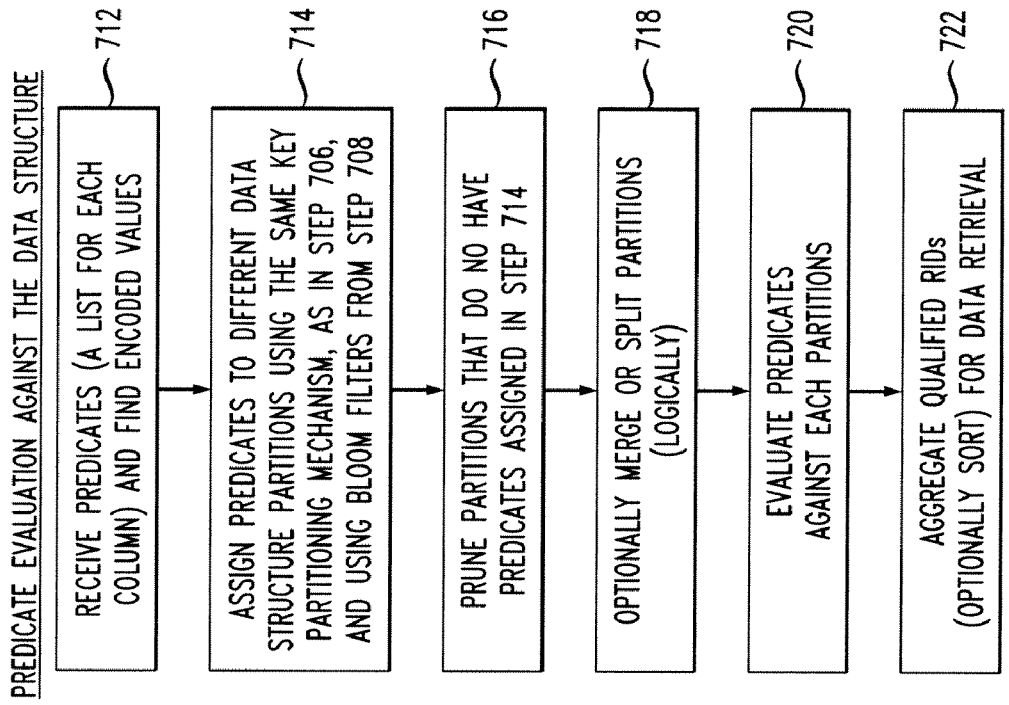
FIG. 7 is a flow diagram illustrating data structure build and predicate evaluation against the data structure, according to an embodiment of the present invention.
Figure 7:
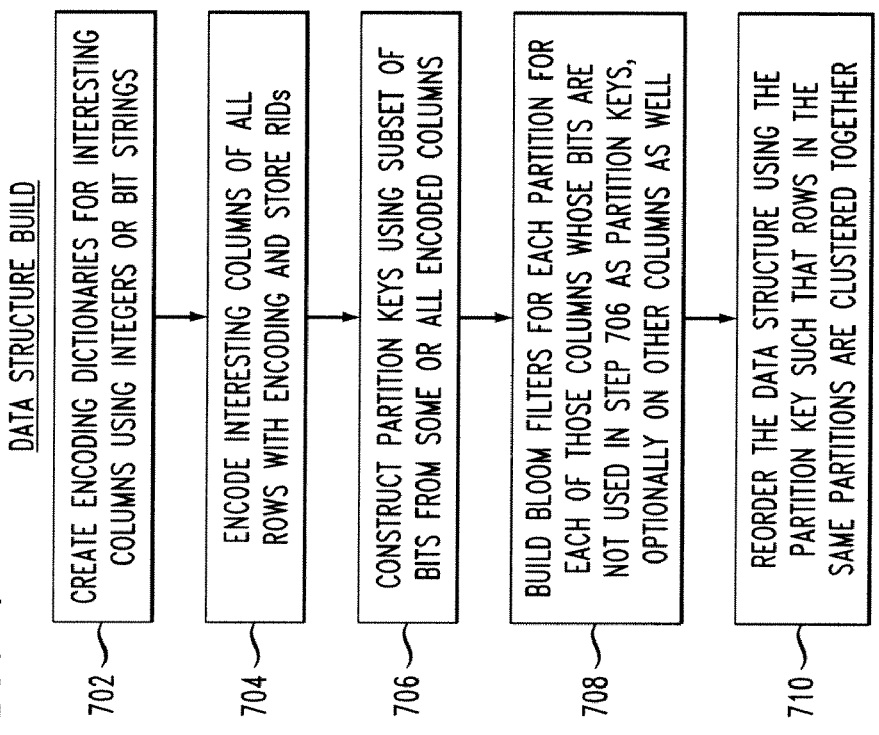

FIG. 7 is a flow diagram illustrating data structure build and predicate evaluation against the data structure, according to an embodiment of the present invention. FIG. 7 depicts a data structure build, which includes the following steps. Step 702 includes creating encoding dictionaries for interesting columns using integers or bit strings. Step 704 includes encoding interesting columns of all rows with encoding and storing RIDs. Step 706 includes constructing partition keys using subset of bits from some or all encoded columns. Step 708 includes building bloom filters for each partition for each of those columns whose bits are not used in step 706 as partition keys, optionally on other columns as well. Also, step 710 includes reordering the data structure using the partition key such that rows in the same partitions are clustered together.

FIG. 7 also depicts predicate evaluation against the data structure, which includes the following steps. Step 712 includes receiving predicates (a list for each column) and finding encoded values. Step 714 includes assigning predicates to different data structure partitions using the same key partitioning mechanism as in step 706, and using bloom filters from step 708. Step 716 includes pruning partitions that do no have predicates assigned in step 714. Step 718 includes optionally merging or splitting partitions (logically). Step 720 includes evaluating predicates against each partition. Also, step 722 includes aggregating qualified RIDs (and optionally sort) for data retrieval.

Also, one or more embodiments of the invention can include using bits from low cardinality columns for partitioning, as well as building bloom filters for high cardinality columns. Further, as detailed herein, one or more embodiments of the invention include using dictionaries. Dictionaries can be sorted (and encoded) in key order for fast search and range predicate handling. For certain columns and data types whose column values can be directly mapped to encoded values, encoding dictionaries do not have to be physically stored. For columns with non-cardinal data, encoding can be used on partial column values or hash function can be applied on the columns (for example, float or timestamp data types). Also, in one or more embodiments of the invention, this can be extended to variable character data type. The mapping between distinct column values and encoding values is not necessarily one-to-one. Upon collisions, however, record data will need to be checked for verification.

One or more embodiments of the invention include a multidimensional scheme because the data structure and a predicate search are divided into separate divided (partitioned) data structures as a way to generate data-level parallelism work. Statistics on columns bit in the data structure can be used to dictate whether a column is suitable to be selected as partition bits. When number of partitions is very high, partition IDs can be used as an index pointing to an address in a storage which might contain the matching row. This can be useful, for example, when columns in a table are not very wide.

As detailed herein, in one or more embodiments of the invention, a sweet spot can be identified for best performance that balances the amount of data to be examined (after pruning) and overall partition overhead. Certain columns could be favored over other columns based on predicate patterns such as, for example, on columns with more frequent predicates. One or more embodiments of the invention additionally include further partitioning of partition IDs (that is, multi-tier partitioning). Parallel bloom filters can also be introduced to each partition to further prune predicates/partitions before each partition is scanned. Further, bits from certain columns can also be used for partitioning and build bloom filter on other columns.

Figure 8:
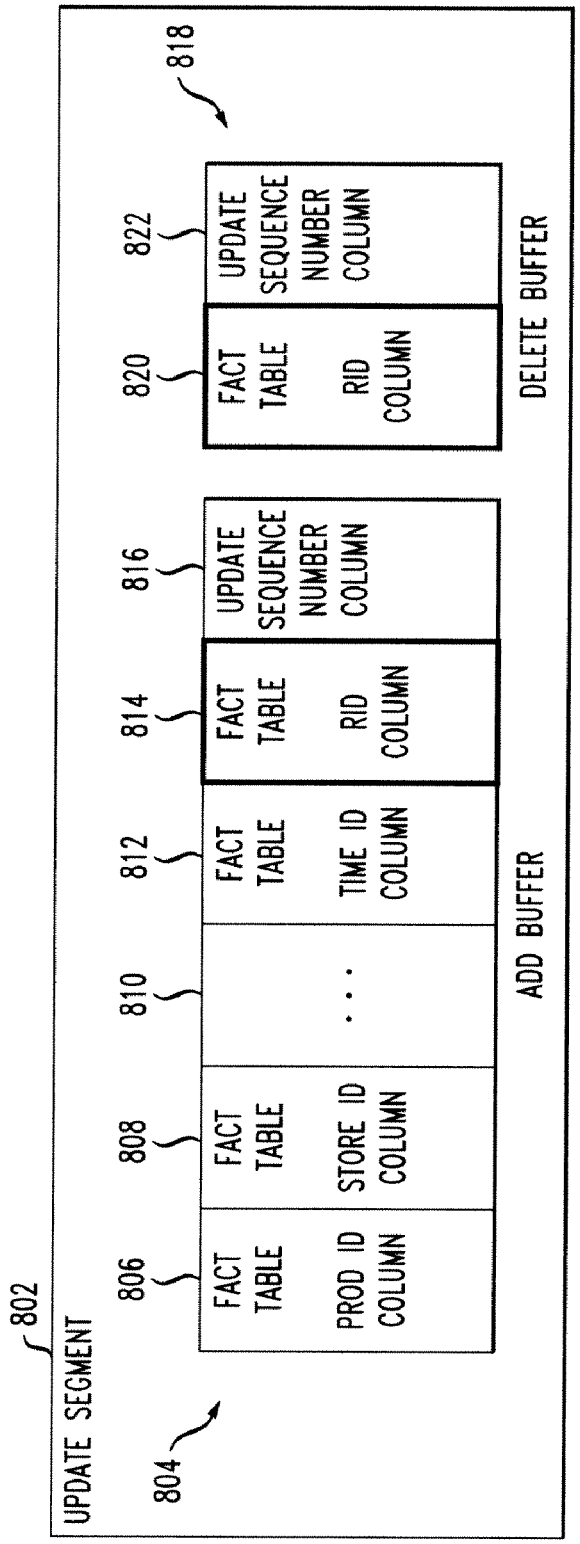
FIG. 8 is a diagram illustrating an update buffer, according to an embodiment of the present invention.

FIG. 8 is a diagram illustrating an update buffer, according to an embodiment of the present invention. By way of illustration, FIG. 8 depicts an update segment 802, which includes an ADD buffer 804 and a DELETE buffer 818. The ADD buffer 804 includes a fact table product ID column 806, a fact table store ID column 808, additional column(s) 810, a fact table time ID column 812, a fact table RID column 814 and an update sequence number column 816. The DELETE buffer 818 includes a fact table RID column 820 and an update sequence number column 822.

From database operation and interface to the new index prospective, the insert, update or delete operation to the new index is similar to any B-tree index. The location of the record to be updated, inserted or deleted is dictated by the database space search and allocation algorithm. Once the table is updated, the RID and attributes needed by the new index of the updated record is sent to a secondary index for update. Within the new index, all updates that occur during a period of time are appended in a separate UPDATE segment of the index which includes an ADD buffer and a DELETE buffer. Correspondingly, one or more embodiments of the invention refer to the storage that holds the data before the start of the period a STABLE segment of the index and the two segments are merged periodically at a time such as, for example, the end of a business day or week.

The ADD buffer has an extra column which is a sequence number column to preserve the ordering of the updates. The DELETE buffer only needs to store the RID column and the sequence number column. Inserted records are stored in an ADD buffer, while the DELETE buffer stores the RIDs of deleted records. A record update in the table is equivalent to a delete and an insert using two consecutive sequence numbers to the new index. By way of example, a reason to use this approach rather than physically updating the STABLE segment is to avoid random memory access or disk I/O as well as avoiding locking or latching on the STABLE segment which holds most of the data for queries. There can be one update segment for the entire index. There can also be one update segment for each partition.

As described herein, the layout of an UPDATE segment is shown as in FIG. 8. The ADD and DELETE (DEL) buffer each is a list of blocks that record the updated data. The updates are simply appended to the end of each buffer. The blocks are gradually sorted in RID order and several smaller sorted blocks can be merged into a larger block.

As also detailed herein, one or more embodiments of the invention include the use of insert, update and delete operations. In an insert operation, an entry is added to the end of the last ADD block, including a unique global sequence number (seqNo). The seqNo is in the same order of time stamp. In a delete operation, an entry is added to the end of the last DEL block, including a unique global sequence number (seqNo). An update operation includes a delete operation and then an insert operation (SeqNo(insert)=SeqNo(delete)+1).

Further, in a search operation, one or more embodiments of the invention include denoting 'S' for a stable store, '−' for a DEL store, '+' for an ADD store. Also, for example, performing a search can include the following: [R(S) Excl R(−)] UNION [(R(+) ExclSeqNum (R(−)]

R( )=qualified RIDs in a particular store that are sorted in RID order,

Excl=exclude RIDs that also exist in delete store,

ExclSeqNum=exclude RIDs that also exist in the DEL store whose seqNum is higher than in the ADD store.

UNION is to merge the RIDs from each set and removing duplicates.

Data (RID result) movement should be reduced as much as possible during the above operations, and can be deferred only to the last stage, merged and returned to DB2 if possible.

Figure 9:
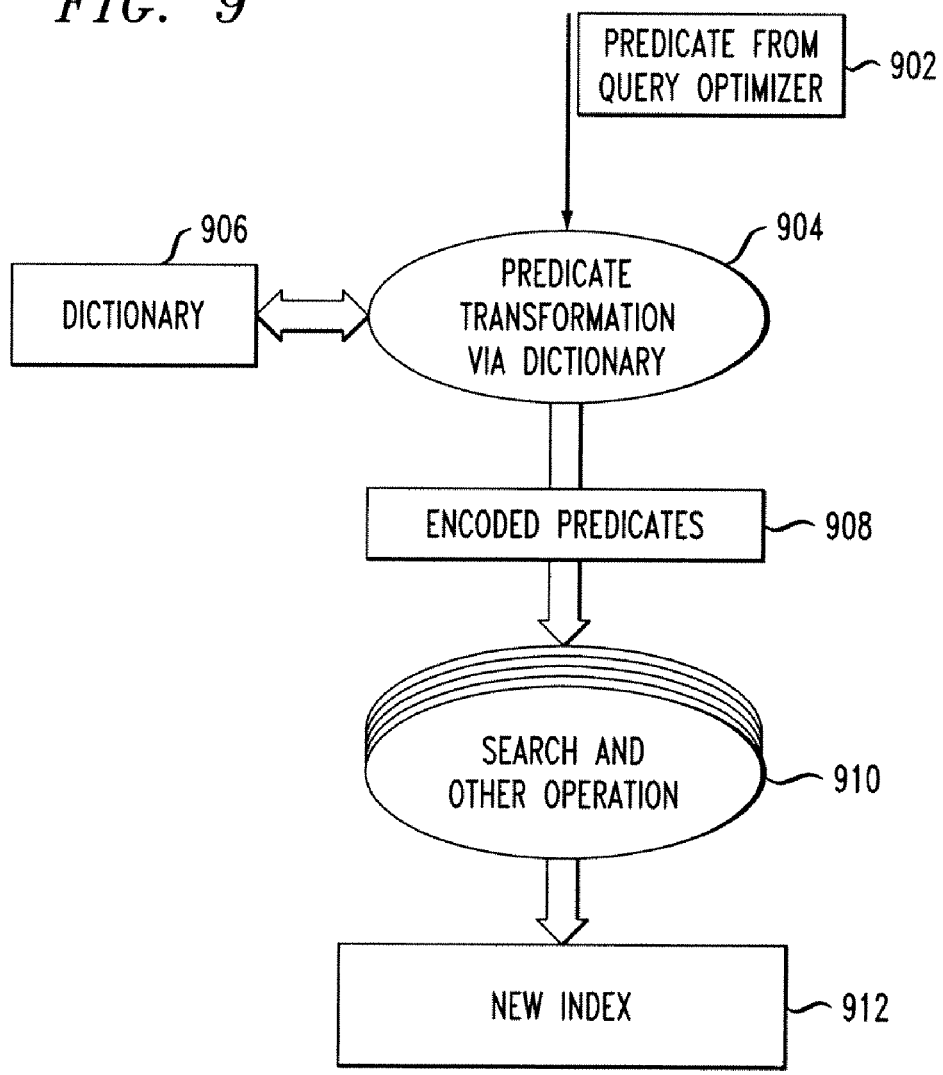
FIG. 9 is a block diagram illustrating an exemplary embodiment, according to an aspect of the invention.

FIG. 9 is a block diagram illustrating an exemplary embodiment, according to an aspect of the invention. By way of illustration, FIG. 9 depicts a predicate from a query optimizer component 902 being sent to a predicate transformation (via dictionary) component 904. As depicted in FIG. 9, the predicate transformation component 904 interacts with a dictionary component 906, as well as with a predicate encoding component 908. The encoded predicates are sent to an operation component 910 for, by way of example, searching and additional operations. Further, the operation component generates a new index 912.

Figure 10:
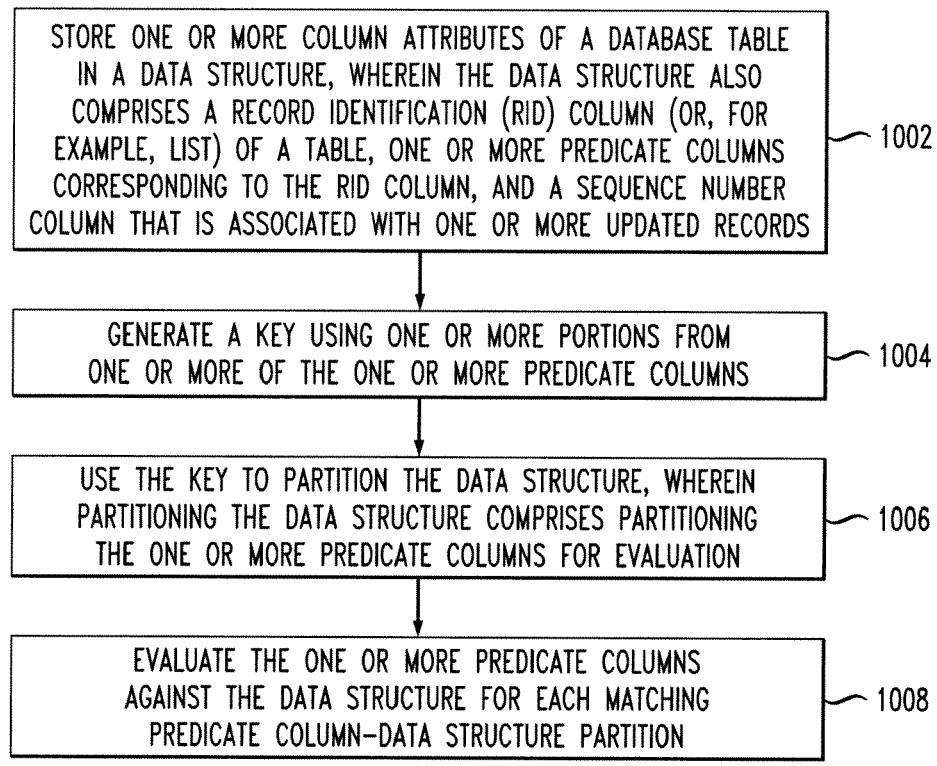
FIG. 10 is a flow diagram illustrating techniques for database table look-up, according to an embodiment of the invention.

FIG. 10 is a flow diagram illustrating techniques for database table look-up, according to an embodiment of the present invention. Step 1002 includes storing one or more column attributes of a database table in a data structure, wherein the data structure also comprises a record identification (RID) column (or, for example, list) of a table, one or more predicate columns corresponding to the RID column, and a sequence number column that is associated with one or more updated records (for example, newly added data, updated data and/or deleted data). The column attributes can include data of one or more additional columns (such as, for example, frequently queried data columns).

Step 1004 includes generating a key using one or more portions from one or more of the one or more predicate columns. The key can include a concatenated bit string and/or a concatenated integer. Also, using portions from predicate columns can include, for example, taking bits and/or digits from one or more of the predicate columns. The bit and/or digit positions are fixed within each column.

Step 1006 includes using the key to partition the data structure, wherein partitioning the data structure comprises partitioning the one or more predicate columns for evaluation. Partitioning can include using a multidimensional scheme to divide the data structure and decouple a predicate search. Step 1008 includes evaluating (via a scan and/or via a search) the one or more predicate columns against the data structure for each matching predicate column-data structure partition.

The techniques depicted in FIG. 10 additionally include encoding each value of the predicate columns with bit string encoding and/or integer encoding. Also, in one or more embodiments of the invention, an encoding overflow is handled by applying a secondary encoding for updated records. Further, one or more embodiments of the invention can include over-partitioning (that is, to create more partitions than an expected number of threads) the data structure. This can be performed, for example, because predicates can be specified on a subset of columns. Also, some partitions can be merged (logically) during predicate evaluation. Further, the techniques depicted in FIG. 10 can include partitioning in conjunction with bloom filtering for partition and predicate pruning.

As also detailed herein, the data structure can additionally include a sequence number column (for example, a timestamp) to store newly added data and/or updated data. The data structure can also store an RID column and a sequence number column to record deleted data, as well as define one or more database operations (such as, for example, insert, update and/or delete). Further, one or more embodiments of the invention can include sorting rows within each partition based on one or more subsets of columns and/or corresponding hash values to expedite a predicate search (for example, on those columns).

The techniques depicted in FIG. 10 can also, as described herein, include providing a system, wherein the system includes distinct software modules, each of the distinct software modules being embodied on a tangible computer-readable recordable storage medium. The distinct software modules can include, for example, a query optimizer module, a predicate transformation module, a dictionary module, a predicate encoding module and an operation module executing on a hardware processor.

Additionally, the techniques depicted in FIG. 10 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 11:
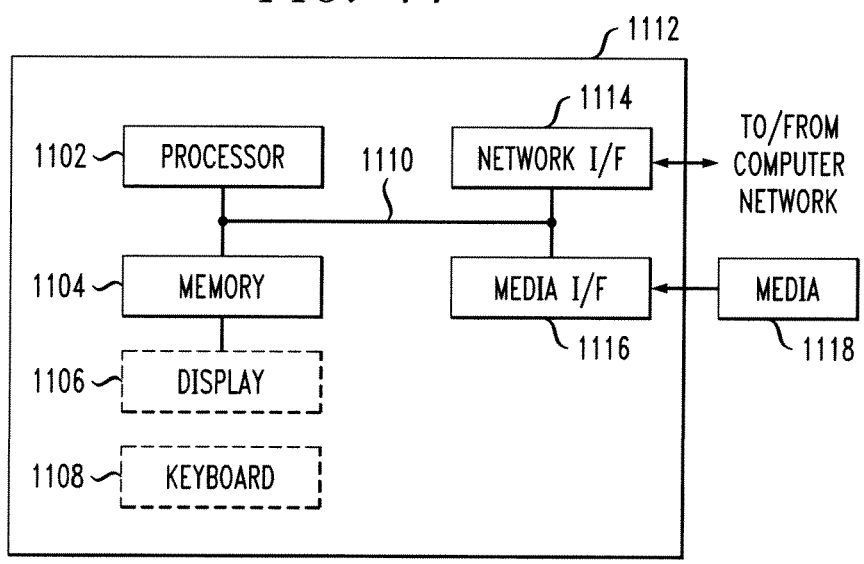
FIG. 11 is a system diagram of an exemplary computer system on which at least one embodiment of the invention can be implemented.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 9. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing a single, sorted data structure that stores encoded column attributes.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for database table look-up, wherein the method comprises:
    storing one or more column attributes of a database table in a data structure, wherein the data structure is an auxiliary structure for the database table and also comprises a record identification (RID) column of a table that associates the database table and the auxiliary structure, one or more predicate columns corresponding to the RID column, and a sequence number column that is associated with one or more updated records;
    generating a key using one or more portions from one or more of the one or more predicate columns;
    using the key to partition the data structure, wherein partitioning the data structure comprises partitioning the one or more predicate columns for evaluation; and
    evaluating the one or more predicate columns against the data structure for each matching predicate column-data structure partition.

2. The method of claim 1, wherein the one or more updated records comprise at least one of newly added data, updated data and deleted data.

3. The method of claim 1, wherein the data structure defines one or more database operations, wherein the one or more database operations comprise at least one of insert, update and delete.

4. The method of claim 1, further comprising encoding each value of each of the one or more predicate columns with at least one of bit string encoding and integer encoding.

5. The method of claim 4, wherein an encoding overflow is handled by applying a secondary encoding for updated records.

6. The method of claim 1, further comprising over-partitioning the data structure, wherein over-partitioning the data structure comprises creating more partitions than an expected number of threads.

7. The method of claim 1, further comprising partitioning in conjunction with bloom filtering for partition and predicate pruning.

8. The method of claim 1, wherein the one or more column attributes comprise data of one or more additional columns.

9. The method of claim 1, wherein the key comprises at least one of a concatenated bit string and a concatenated integer.

10. The method of claim 1, wherein using one or more portions from one or more of the one or more predicate columns comprises taking at least one of one or more bits and one or more digits from one or more of the one or more predicate columns.

11. The method of claim 1, wherein partitioning comprises using a multidimensional scheme to divide the data structure and decouple a predicate search.

12. The method of claim 1, wherein evaluating comprises evaluating via at least one of a scan and a search.

13. The method of claim 1, further comprising sorting one or more rows within each partition based on at least one of one or more subsets of columns and one or more corresponding encoding values to expedite a predicate search.

14. The method of claim 1, further comprising providing a system, wherein the system comprises one or more distinct software modules, each of the one or more distinct software modules being embodied on a tangible computer-readable recordable storage medium, and wherein the one or more distinct software modules comprise a query optimizer module, a predicate transformation module, a dictionary module, a predicate encoding module and an operation module executing on a hardware processor.

15. A computer program product comprising a tangible computer readable recordable storage medium including computer useable program code for database table look-up, the computer program product including:
    computer useable program code for storing one or more column attributes of a database table in a data structure, wherein the data structure is an auxiliary structure for the database table and also comprises a record identification (RID) column of a table that associates the database table and the auxiliary structure, one or more predicate columns corresponding to the RID column, and a sequence number column that is associated with one or more updated records;
    computer useable program code for generating a key using one or more portions from one or more of the one or more predicate columns;
    computer useable program code for using the key to partition the data structure, wherein partitioning the data structure comprises partitioning the one or more predicate columns for evaluation; and
    computer useable program code for evaluating the one or more predicate columns against the data structure for each matching predicate column-data structure partition.

16. The computer program product of claim 15, wherein the one or more updated records comprise at least one of newly added data, updated data and deleted data.

17. The computer program product of claim 15, wherein the data structure defines one or more database operations, wherein the one or more database operations comprise at least one of insert, update and delete.

18. The computer program product of claim 15, further comprising computer useable program code for encoding each value of each of the one or more predicate columns with at least one of bit string encoding and integer encoding.

19. The computer program product of claim 15, further comprising computer useable program code for partitioning in conjunction with bloom filtering for partition and predicate pruning.

20. A system for database table look-up, comprising:
    a memory; and
    at least one processor coupled to the memory and operative to:
        store one or more column attributes of a database table in a data structure, wherein the data structure is an auxiliary structure for the database table and also comprises a record identification (RID) column of a table that associates the database table and the auxiliary structure, one or more predicate columns corresponding to the RID column, and a sequence number column that is associated with one or more updated records;
        generate a key using one or more portions from one or more of the one or more predicate columns;
        use the key to partition the data structure, wherein partitioning the data structure comprises partitioning the one or more predicate columns for evaluation; and
        evaluate the one or more predicate columns against the data structure for each matching predicate column-data structure partition.

21. The system of claim 20, wherein the one or more updated records comprise at least one of newly added data, updated data and deleted data.

22. The system of claim 20, wherein the data structure defines one or more database operations, wherein the one or more database operations comprise at least one of insert, update and delete.

23. The system of claim 20, wherein the at least one processor coupled to the memory is further operative to encode each value of each of the one or more predicate columns with at least one of bit string encoding and integer encoding.

24. The system of claim 20, wherein the at least one processor coupled to the memory is further operative to partition in conjunction with bloom filtering for partition and predicate pruning.

25. An apparatus for database table look-up, the apparatus comprising:
- means for storing one or more column attributes of a database table in a data structure, wherein the data structure is an auxiliary structure for the database table and also comprises a record identification (RID) column of a table that associates the database table and the auxiliary structure, one or more predicate columns corresponding to the RID column, and a sequence number column that is associated with one or more updated records;
- means for generating a key using one or more portions from one or more of the one or more predicate columns;
- means for using the key to partition the data structure, wherein partitioning the data structure comprises partitioning the one or more predicate columns for evaluation; and
- means for evaluating the one or more predicate columns against the data structure for each matching predicate column-data structure partition.

* * * * *